US008591690B2

(12) United States Patent
Sugimoto et al.

(10) Patent No.: US 8,591,690 B2
(45) Date of Patent: Nov. 26, 2013

(54) METHOD FOR MANUFACTURING LIQUID CRYSTAL DISPLAY ELEMENT

(75) Inventors: Yuu Sugimoto, Ibaraki (JP); Seiji Umemoto, Ibaraki (JP); Takuya Nakazono, Ibaraki (JP)

(73) Assignee: Nitto Denko Corporation, Ibaraki-shi (JP)

( * ) Notice: Subject to any disclaimer, the term of this patent is extended or adjusted under 35 U.S.C. 154(b) by 497 days.

(21) Appl. No.: 12/715,079

(22) Filed: Mar. 1, 2010

(65) Prior Publication Data

US 2010/0236702 A1    Sep. 23, 2010

(30) Foreign Application Priority Data

Mar. 18, 2009   (JP) .................................. 2009-066688

(51) Int. Cl.
*B29C 65/00*   (2006.01)
*B32B 37/00*   (2006.01)
*B32B 38/04*   (2006.01)

(52) U.S. Cl.
USPC ........................... 156/257; 156/268; 156/270

(58) Field of Classification Search
USPC ......................... 156/257, 268, 264, 270, 521
See application file for complete search history.

(56) References Cited

U.S. PATENT DOCUMENTS

| | | | |
|---|---|---|---|
| 7,815,761 B2 * | 10/2010 | Phillips | 156/80 |
| 8,083,885 B2 * | 12/2011 | Kitada et al. | 156/259 |
| 2002/0098352 A1 * | 7/2002 | Kishioka | 428/352 |
| 2005/0016670 A1 | 1/2005 | Kanbara et al. | |
| 2006/0107811 A1 * | 5/2006 | Tanaka et al. | 83/175 |
| 2006/0124248 A1 | 6/2006 | Kanbara et al. | |
| 2009/0199950 A1 | 8/2009 | Kitada et al. | |
| 2009/0218049 A1 | 9/2009 | Kanbara et al. | |
| 2010/0186890 A1 * | 7/2010 | Kitada et al. | 156/256 |

FOREIGN PATENT DOCUMENTS

| | | |
|---|---|---|
| JP | 57-52017 A | 3/1982 |
| JP | 10-102010 A | 4/1998 |
| JP | 2005-37416 A | 2/2005 |
| JP | 2008-180765 A | 8/2008 |
| TW | 200841054 A | 10/2008 |
| WO | 2008/047712 A1 | 4/2008 |

OTHER PUBLICATIONS

English translation of Takeshi (JP57-5201), 8 pages, Mar. 1982.*

(Continued)

*Primary Examiner* — Linda Gray
(74) *Attorney, Agent, or Firm* — Westerman, Hattori, Daniels & Adrian, LLP

(57) ABSTRACT

A method for manufacturing a liquid crystal display element is provided which simultaneously achieves the object of cutting an optical film without causing degradation in appearance and the object of preventing the film from being broken in a continuous bonding process, and includes: providing a long sheet material including a laminate of an optical film containing a polarizer, a pressure-sensitive adhesive layer, and a carrier film temporarily bonded to the pressure-sensitive adhesive layer; cutting the long sheet material at predetermined intervals, while maintaining the continuity of the carrier film; peeling off the carrier film by a tensile force; and continuously bonding the resulting optical film pieces to liquid crystal panels, respectively, through the pressure-sensitive adhesive layer exposed by the peeling off, while feeding the resulting optical film pieces, wherein the cutting is performed to such a depth as to substantially reach the carrier film, and the carrier film is cut to a depth less than half of the thickness of the carrier film at least both end portions in the width direction of the carrier film.

8 Claims, 4 Drawing Sheets

(56) References Cited

OTHER PUBLICATIONS

Japanese Right of Refusal, mailing date of Dec. 24, 2009, issued in corresponding Application No. 2009-066688.
Japanese Office Action dated Jan. 6, 2011, issued in corresponding Japanese Patent Application No. 2010-243865.
Japanese Office Action dated Mar. 23, 2011, issued in corresponding Japanese Patent Application No. 2010-243865.
Taiwan Office Action dated Feb. 13, 2012, issued in corresponding Taiwanese Patent Application No. 098139251.
Japanese Office Action dated Jul. 29, 2011, issued in corresponding Japanese Patent Application No. 2010-243865.
Taiwanese Office Action dated Jun. 13, 2012, issued in corresponding Taiwanese Patent Application No. 101100976, with English translation (7 pages).
US Office Action dated Sep. 26, 2013, issued in corresponding U.S. Appl. No. 13/351,714.

* cited by examiner

METHOD FOR MANUFACTURING LIQUID CRYSTAL DISPLAY ELEMENT

BACKGROUND OF THE INVENTION

1. Field of the Invention

The invention relates to a method for manufacturing a liquid crystal display element, including: providing a long sheet material including a laminate of an optical film containing a polarizer, a pressure-sensitive adhesive layer, and a carrier film temporarily bonded to the pressure-sensitive adhesive layer; cutting the long sheet material at predetermined intervals, while maintaining the continuity of the carrier film; and then continuously bonding the resulting optical film pieces to liquid crystal panels, respectively, while peeling off the carrier film from the optical film pieces.

2. Description of the Related Art

Polarizing plates are essential for liquid crystal display devices. In many cases, polarizing plates are each transported and bonded in the form of a completely cut piece. In such cases, however, there are some problems such as low productivity and a shift in the position of the polarizing plate due to curling of the polarizing plate during a bonding process. Therefore, continuous bonding techniques are proposed (see for example Japanese Patent Application Laid-Open No. 2005-037416 and No. 57-52017).

The continuous bonding process includes unwinding and feeding a polarizing plate from a material roll, performing half cutting in which a laminated structure including the polarizing plate is partially cut in the thickness direction, while part (carrier film) of the laminated structure is left uncut, so that polarizing plate pieces are obtained, and then bonding each piece. The portion left uncut in the half cutting process maintains the continuity and therefore can be used as a carrier, so that cut pieces of the polarizing plate can be continuously bonded to liquid crystal panels, respectively, after the cut pieces of the polarizing plate are transported by a tensile force.

In the half cutting process, however, a pressure-sensitive adhesive layer is sometimes incompletely cut and partially left uncut, depending on the accuracy of the cut depth. When the pressure-sensitive adhesive layer is left uncut in such a manner, the uncut portion of the pressure-sensitive adhesive layer may be torn in the process of peeling off an optical film layer from a carrier film, so that permanent deformation may occur in which an end portion of the pressure-sensitive adhesive is deformed into a ball shape due to stretching followed by tearing. Particularly when a pressure-sensitive adhesive having low elastic modulus (soft) is used, such deformation of the pressure-sensitive adhesive layer is more likely to occur. In the process from the half cutting to the bonding, the end face cannot be processed, because the polarizing plate is placed on the carrier film. As a result, voids are formed in the liquid crystal panel having the bonded polarizing plate (namely, liquid crystal display element) due to the deformation of the pressure-sensitive adhesive layer, or peeling occurs from the end portion, which may also be a cause of leakage of light from such portions or any other fatal defect.

In order to avoid such problems, the pressure-sensitive adhesive layer may be completely cut in such a manner that the depth of the cut formed by half cutting can reach the carrier film layer. If the pressure-sensitive adhesive layer is completely cut, the pressure-sensitive adhesive layer can be prevented from being deformed in the process of peeling off the optical film piece from the carrier film (see Japanese Patent Application Laid-Open No. 2005-037416).

Patent Document 1: Japanese Patent Application Laid-Open (JP-A) No. 2005-037416

Patent Document 2: Japanese Patent Application Laid-Open (JP-A) No. 57-52017

SUMMARY OF THE INVENTION

Depending on the depth of the cut formed by half cutting, however, the carrier film may be broken by a tensile force applied during the feeding or the peeling off of the carrier film, even when the feeding distance is short. Particularly in a system for continuously bonding films to liquid crystal panels under a certain tension, a jogging state is attained in which the start and stop of the feeding of the carrier film are repeated, in contrast to a monotonous feeding system, so that the stress applied to the film at the start of the feeding reaches several times that at the normal time, which significantly increases the risk of breakage of the film, because a large load is applied in the process of peeling off the carrier film with an edge-shaped member or the like.

As a result of experiments carried out by the inventors, it has been found that the risk of breakage of the film is more significant in a case where end portions in the width direction of the film are deeply cut than in a case where a central portion in the width direction of the film is deeply cut. In other words, it has been found that if the end portions of the film are deeply cut, the mechanical strength of the entire film may be significantly reduced in such a jogging state, which is more likely to be a cause of breakage during the feeding.

In this regard, Japanese Patent Application Laid-Open No. 2005-037416 proposes that the bottom dead point position of a cutter should be set within 0 to 0.5 times the thickness of the release film in the half cutting process in order to prevent the pressure-sensitive adhesive layer from being left uncut (see claim 5 and paragraph ([0021]). In Japanese Patent Application Laid-Open No. 2005-037416, however, the above problems with the continuous bonding process are not carefully considered. Therefore, even when the bottom dead point position is set as stated above, the accuracy of the cut depth varies so that a deeply cut portion is inevitably formed, and therefore, the risk of breakage of the film in a jogging state cannot be avoided in some cases.

Thus, an object of the invention is to provide a method for manufacturing a liquid crystal display element, which simultaneously achieves the object of cutting an optical film without causing degradation in appearance and the object of preventing the film from being broken in a continuous bonding process.

The objects are achieved by the invention described below.

A method for manufacturing a liquid crystal display element according to the present invention relates to a method for manufacturing a liquid crystal display element, comprising: providing a long sheet material including a laminate of an optical film containing a polarizer, a pressure-sensitive adhesive layer, and a carrier film temporarily bonded to the pressure-sensitive adhesive layer; cutting the long sheet material at predetermined intervals, while maintaining the continuity of the carrier film; peeling off the carrier film by a tensile force; and continuously bonding the resulting optical film pieces to liquid crystal panels, respectively, through the pressure-sensitive adhesive layer exposed by the peeling off, while feeding the resulting optical film pieces, wherein the cutting is performed to such a depth as to substantially reach the carrier film, and the carrier film is cut to a depth less than half of the thickness of the carrier film at least both end portions in the width direction of the carrier film. As used herein, the phrase "the cutting is performed to such a depth as to substantially reach the carrier film" refers to a state where the cut reaches the carrier film over 80% or more of the length of the cut in the width direction of the carrier film. This state may be achieved by previously setting, as a target value for half cutting, a certain depth of a cut that reaches the inside of the carrier film. The phrase is also intended to include a case where even when the target value of the cut depth for half cutting is outside such a range, the cut reaches the carrier film over the length stated above, depending on the accuracy of the cutting apparatus.

According to the method of the invention for manufacturing a liquid crystal display element, the cutting is performed to such a depth as to substantially reach the carrier film, and the carrier film is cut to a depth less than half of the thickness of the carrier film at least both end portions in the width direction of the carrier film, so that the object of cutting an optical film without causing degradation in appearance and the object of preventing the film from being broken in a continuous bonding process can be achieved at the same time. When a laminate of an optical film, a pressure-sensitive adhesive layer and a carrier film (placed in this order) is half-cut into a size substantially equal to the size of a liquid crystal panel to which the optical film will be bonded, while the carrier film will be left, the depth of the cut formed by the half cutting is not constant due to the machine accuracy (fitting accuracy) and is also influenced by the film thickness error, so that a cut portion and a continuous portion can be easily formed in the pressure-sensitive adhesive layer. This may cause a protrusion of the pressure-sensitive adhesive during the bonding process or cause a poor appearance that does not disappear with time, such as void formation.

On the other hand, if half or more of the thickness of the carrier film is cut in order to avoid this problem, the carrier film may be broken by a tensile force applied during carrying, depending on the state (depth) of the cut at both end portions of the film, even when the feeding distance is short. In contrast, the invention makes it possible to set an average depth and to set the depth of the cut at both end portions in a predetermined range by variation control, so that the object of cutting an optical film without causing degradation in appearance and the object of preventing the film from being broken in a continuous bonding process can be achieved at the same time.

In the above method, the carrier film is preferably peeled off from the pressure-sensitive adhesive layer by turning the direction of the feeding of the carrier film at an acute angle, for example, using an edge-shaped member. In the invention, the carrier film is cut to a depth less than half of the thickness of the carrier film at least both end portions in the width direction of the carrier film. Even in such a high-load peeling method, therefore, the carrier film is less likely to be broken, so that the carrier film can be smoothly and sequentially peeled off from the pressure-sensitive adhesive layer.

In the cutting process, the carrier film is preferably supported on a mount and preferably cut with a blade, and the vertical position of the surface of the mount is preferably lower at both end portions in the width direction of the carrier film than at the other portions. Cutting with a blade has a problem in which it is difficult to delicately change the depth of the cut (for example, in the order of $\mu m$), although dust or the like can be made less likely to occur. In contrast, when the vertical position of the mount surface is made lower at least both end portions in the width direction of the carrier film, the distance between the mount surface and the blade can be locally increased, so that the depth of the cut in the carrier film can be more reliably reduced at those portions.

In the cutting process, the relation: $3\ \mu m < c < (d/2)\ \mu m$, wherein c represents the depth of the cut in the carrier film, and d represents the thickness of the carrier film, is preferably satisfied over 60% or more of the length of the cut. With such a cut depth distribution, the cutting is more reliably performed to such a depth as to reach the carrier film, and the carrier film is more reliably cut to a depth less than half of the thickness of the carrier film at least both end portions in the width direction of the carrier film.

The carrier film preferably has a thickness of 20 $\mu m$ or more to less than 40 $\mu m$. Such a thickness makes it possible to more reliably cut the pressure-sensitive adhesive layer and more reliably prevent a poor appearance, while the depth of the cut at least both end portions in the width direction of the carrier film is kept less than half of the thickness of the film.

The carrier film preferably has a breaking strength of 180 MPa or more. When the breaking strength is in this range, the film can be more reliably prevented from being broken in the continuous bonding process by keeping the depth of the cut less than half of the thickness of the carrier film at least both end portions in the width direction of the carrier film.

In the cutting process, an incompletely cut portion of the pressure-sensitive adhesive layer is preferably 10% or less of the length of the cut, and an uncut portion of the pressure-sensitive adhesive layer preferably has a thickness of at most 3 $\mu m$. When the percentage of an incompletely cut portion of the pressure-sensitive adhesive layer and the corresponding thickness are each in the above range, voids are less likely to be formed in the laminated liquid crystal panel (liquid crystal display element) due to the deformation of the pressure-sensitive adhesive layer, and peeling is less likely to occur from the end portion. Leakage of light from such portions or any other fatal defect is also less likely to occur.

DETAILED DESCRIPTION OF THE PREFERRED EMBODIMENTS

The method of the invention for manufacturing a liquid crystal display element includes: providing a long sheet material including a laminate of an optical film containing a polarizer, a pressure-sensitive adhesive layer, and a carrier film temporarily bonded to the pressure-sensitive adhesive layer; cutting the long sheet material at predetermined intervals, while maintaining the continuity of the carrier film; peeling off the carrier film by a tensile force; and continuously bonding the resulting optical film pieces to liquid crystal panels, respectively, through the pressure-sensitive adhesive layer exposed by the peeling off, while feeding the resulting optical film pieces.

Figure 1:
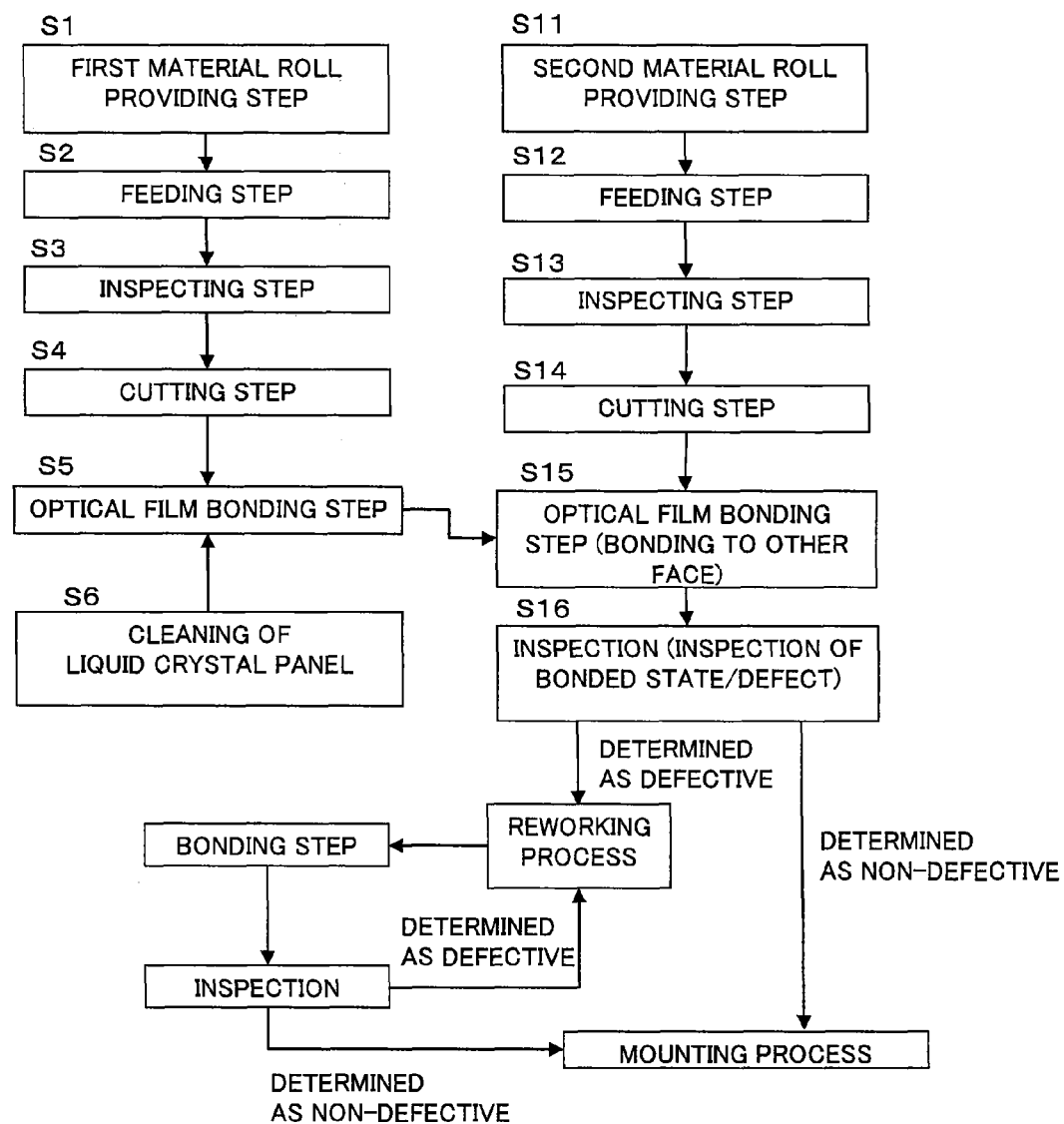
FIG. 1 is a flow chart showing an example of the method of the invention for manufacturing a liquid crystal display element.

For example, the method of the invention for manufacturing a liquid crystal display element may be carried out by the process shown in FIG. 1. Specifically, the method of the invention for manufacturing a liquid crystal display element includes the main steps of cutting a long sheet material and continuously bonding optical film pieces to liquid crystal panels, respectively, after the cutting step, and may further include a material roll providing step, a feeding step, and an inspection step. Based on FIG. 1, each step is described below.

(1) First Material Roll Providing Step (S1 in FIG. 1). A roll according to the present invention is provided as a first material roll. A width of the first material roll depends on a bonding size of the liquid crystal panel. A long sheet material wound as the first material roll is a laminate of an optical film containing a polarizer, a pressure-sensitive adhesive layer, and a carrier film temporarily bonded to the pressure-sensitive adhesive layer.

Figure 4:
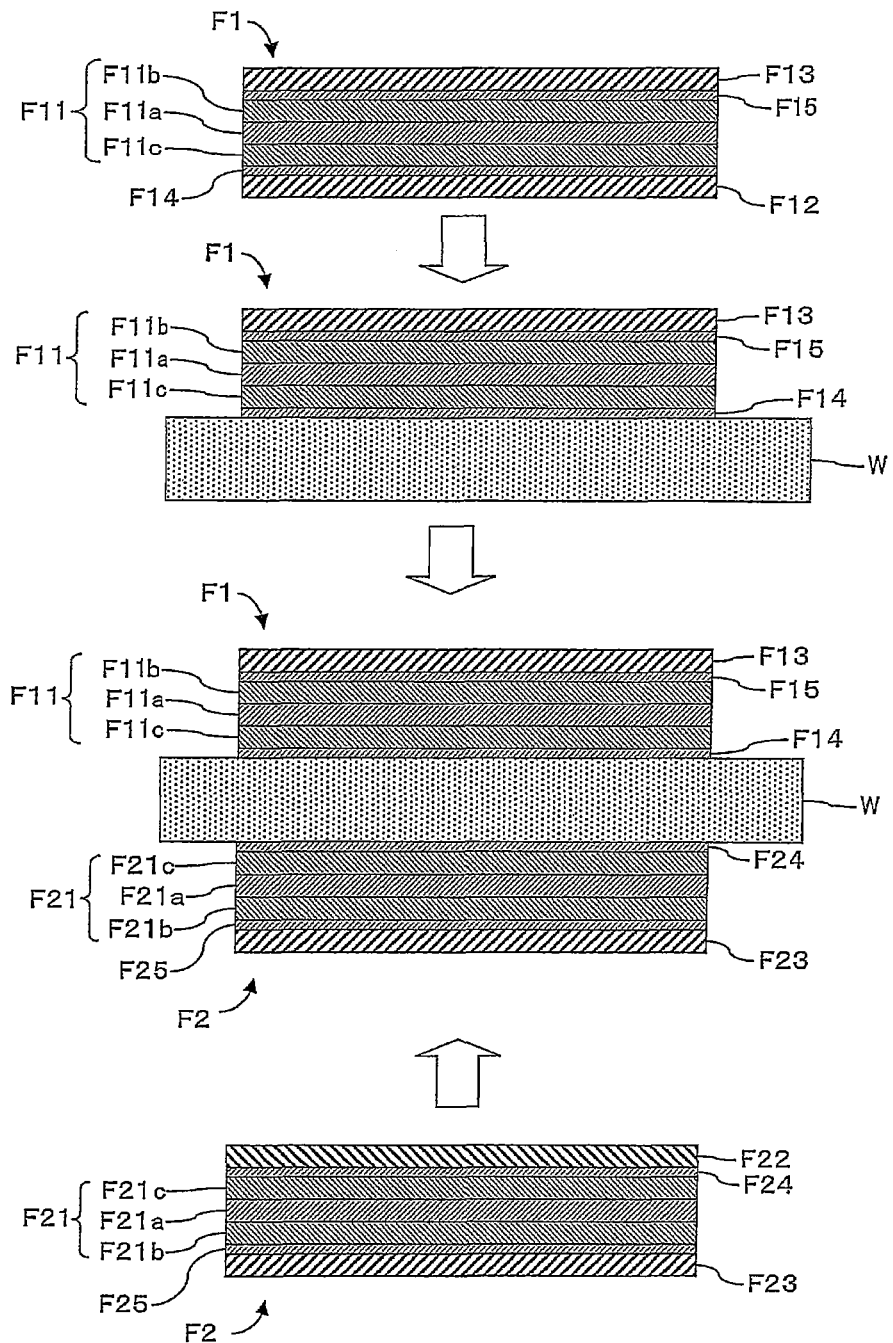
FIG. 4 is a diagram for illustrating an exemplary laminated structure of each of first and second optical films.

As shown in FIG. 4, for example, a lamination structure of a first sheet material F1 has a first optical film F11, a first carrier film F12 and a surface protecting film F13. The first optical film F11 is configured by a first polarizer F11a, a first film F11b provided on one face via an adhesive layer (not shown), and a second film F11c provided on the other face via the adhesive layer (not shown).

The first and second films F11b and F11c are configured, for example, by a polarizer protecting film (for example, a tri-acetyl cellulose film, a PET film or the like). The second film F11c is bonded to the liquid crystal panel face side via a first pressure-sensitive adhesive layer F14. A surface treatment can be applied to the first film F11b. As the surface treatment, for example, there can be listed up a hard coating, an anti-reflection treatment, a treatment aiming at a prevention of a sticking, a diffusion and an anti-glare, and the like. The first carrier film F12 is provided via the second film F11c and the first pressure-sensitive adhesive layer F14. Further, the surface protecting film F13 is provided via the first film F11b and the pressure-sensitive adhesive layer F15. In the following description, there is a case that the laminated structure of the polarizer and the polarizer protecting film is called as the polarizing plate.

(2) Feeding Step (S2 in FIG. 1). The first sheet material is unwound from the provided and placed first material roll, and is fed to a downstream side. The first feeder feeding the first sheet material is constructed, for example, by a pair of nip rollers, a tension roller, a rotary drive, an accumulator, a sensor, a controller and the like. The first sheet material comprises the first carrier film which works as a carrier film.

(3) First Inspection Step (S3 in FIG. 1). A defect of the first sheet material is inspected by using a first defect inspection apparatus. As a defect inspection method in this case, there can be listed up a method of performing imaging and image processing generated by a transmitted light and a reflected light with respect to both faces of the first sheet material, a method of performing imaging and image processing by arranging a optical film for inspection between a CCD camera and a subject to be inspected, in such a manner as to form crossed nicols relation (which may be called as 0 degree cross) to a polarization axis of the polarization plate corresponding to the subject to be inspected, and a method of performing imaging and image processing by arranging an optical film for inspection between a CCD camera and a subject to be inspected, in such a manner as to form a predetermined angle (for example, in a range larger than 0 degree and less than 10 degree)(which may be called as x degree cross) to a polarization axis of the polarization plate corresponding to the subject to be inspected. In this case, a known method can be applied to an algorithm of the image processing, for example, the defect can be detected by grayscale determination in accordance with a binarization processing.

In the performing imaging and image processing method by the transmitted light, it is possible to detect a contaminant in an inner portion of the first sheet material. In the performing imaging and image processing method by the reflected light, it is possible to detect a contaminant attached to the front face of the first sheet material. In the performing imaging and image processing method by the 0 degree cross, it is possible to mainly detect a contaminant on the front face, a dirty, a contaminant in an inner portion and the like as a bright spot. In the performing imaging and image processing method by the x degree cross, it is possible to mainly detect a knick.

The information of the defect obtained by the first defect inspection apparatus is associated with its positional information (for example, a position coordinate), is transmitted to a controller, and can contribute to a cutting method by a first cutting apparatus mentioned below. In the first inspection step, it is preferable that the carrier film is peeled off before the inspection and laminated again after the inspection like the manufacturing system in FIG. 2 from the perspective of improvement in accuracy of the inspection. This point is similar to the second inspection step. In the case of this inspection method, the carrier film before the inspection and the carrier film after the inspection may be the same or different.

Similar improvement effect of a yield ratio can be obtained by executing the inspection step at the time of manufacturing the material roll instead of executing the inspection step in continuous manufacturing step. In other words, there is a case that the defect information (the defect coordinate, the kind of the defect, the size or the like) of the first and second sheet materials is attached as a code information (for example, a QR code and a bar code) to one end portion in a width direction of the first and second material rolls at a predetermined pitch unit (for example, 1000 mm) based on the result of the inspection step which has executed before. In the case mentioned above, the step reads the code information in a preliminary stage of the cutting, and cuts into a predetermined size in the first and second cutting steps in such a manner as to avoid the defect portion based on the analysis (which may be called as a skip cut). Further, the portion including the defect is structured such as to be removed or be bonded to the other member than the liquid crystal panel, and the piece of sheet material which is cut into the predetermined size and is determined as the non-defective is structured such as to be bonded to the liquid crystal panel. Accordingly, a yield ratio of the liquid crystal panels is widely improved.

(4) First Cutting Step (S4 in FIG. 1). The first cutting apparatus cuts (half cuts) the first optical film and the first pressure-sensitive adhesive layer to a predetermined size without cutting the first carrier film. The structure is made such as to cut so as to avoid the defect, based on the information of the defect obtained by the first defect inspection apparatus 14. Accordingly, a yield ratio of the first sheet material F1 is widely improved. The first optical sheet piece including the defect is excluded by a first rejection apparatus 19 mentioned below, and is structured such as not to be attached to the liquid crystal panel. The cutting step will be described in detail later.

(5) First Optical Film Bonding Step (S5 in FIG. 1). The first optical film from which the first carrier film is removed is bonded to the liquid crystal panel via the first pressure-sensitive adhesive layer by using a first bonding apparatus while removing the first carrier film by using the first peeling apparatus. At a time of the bonding, the first optical film and the liquid crystal panel are pinched by roll pairs so as to be crimped. The carrier film is preferably peeled off from the pressure-sensitive adhesive layer by turning the direction of the feeding of the carrier film at an acute angle using an edge-shaped member.

(6) Cleaning Step (S6 in FIG. 1). As necessary, the liquid crystal panel is cleaned on its surface by a polishing cleaning apparatus and a water cleaning apparatus. The cleaned panel is fed to an inspection apparatus by a feeder mechanism.

(7) Second Material Roll Providing Step (S11 in FIG. 1). A roll according to the present invention is provided as a second material roll. A laminated structure of the second sheet material is the same structure as the first sheet material, however, is not limited to this. As shown in FIG. 4, the laminated structure of the second sheet material F2 is the same structure as the first sheet material, however, is not limited to this. For example, the second sheet material F2 has the second optical film F21, a second carrier film F22, and a surface protecting film F23. The second optical film F21 is configured by a second polarizer 21a, a third film F21b provided on one face thereof via an adhesive layer (not shown), and a fourth film F21c provided on the other face thereof via an adhesive layer (not shown).

The third and fourth films F21b and F21c are configured, for example, by a polarizer protecting film (for example, a tri-acetyl cellulose film, a PET film or the like). The fourth film F21c is bonded to the liquid crystal panel face side via a second pressure-sensitive adhesive layer F24. A surface treatment can be applied to the third film F21b. As the surface treatment, for example, there can be listed up a hard coat treatment, a reflection preventing treatment, a treatment aiming at a prevention of a sticking, a diffusion and an anti-glare, and the like. The second carrier film F22 is provided via the fourth film F21c and the second pressure-sensitive adhesive layer F24. Further, the surface protecting film F23 is provided via the third film F21b and the pressure-sensitive adhesive layer F25.

(8) Feeding Step (S12 in FIG. 1). The second sheet material is unwound from the provided and placed second material roll, and is fed to a downstream side. The second feeder feeding the second sheet material is constructed, for example, by a pair of nip rollers, a tension roller, a rotary drive, an accumulator, a sensor, a controller and the like.

(9) Second Inspecting Step (S13 in FIG. 1). A defect of the second sheet material is inspected by using a second defect inspection apparatus. The defect inspecting method in this case is the same as the method by the first defect inspection apparatus mentioned above.

(10) Second Cutting Step (S14 in FIG. 1). The second cutting apparatus cuts (half cuts) the second optical film and the second pressure-sensitive adhesive layer to a predetermined size without cutting the second carrier film. As necessary, the structure is made such as to cut so as to avoid the defect, based on the information of the defect obtained by the second defect inspection apparatus. Accordingly, a yield ratio of the second sheet material is widely improved. The second sheet material including the defect is excluded by a second rejection apparatus, and is structured such as not to be attached to a liquid crystal panel.

(11) Second Optical Film Bonding Step (S15 in FIG. 1). Next, after the second cutting step, the second carrier film from which the second carrier film is removed is bonded to a different face from the face to which the first optical film of the liquid crystal panel is bonded, via the second pressure-sensitive adhesive layer by using a second bonding apparatus while removing the second carrier film by using the second peeling apparatus. In this case, there is a case that the liquid crystal panel is rotated at 90 degree by a feed direction switching mechanism of a feed mechanism before bonding the second optical film to the liquid crystal panel, thereby making the first optical film and the second optical film in a relation of crossed nicols. At a time of the bonding, the second optical film and the liquid crystal panel are pinched by roll pairs so as to be crimped.

(12) Inspecting Step of Liquid Crystal Panel (S16 in FIG. 1). The inspecting apparatus detects the liquid crystal panel in which the optical film is bonded to both the faces. As an inspecting method, there can be exemplified a method of performing imaging and image processing by the reflected light with respect to both the faces of the liquid crystal panel. Further, as the other method, there can be listed up a method of using the optical film for inspecting placed between the CCD camera and the subject to be inspected. In this case, a known method can be applied to an algorithm of the image processing, and it is possible to detect the defect, for example, by grayscale determination in accordance with a binarization processing.

(13) A non-defective of the liquid crystal panel is determined based on the information of the defect obtained by the inspecting apparatus. The liquid crystal panel determined as the non-defective is fed to the next mounting process. In the case that a defective is determined, a reworking process is applied, and the optical film is bonded newly, and is next inspected. In the case that the non-defective is determined, the process gives way to the mounting process, and in the case that the defective is determined, the process again gives way to the reworking process or the defective is put on the shelf.

In the above series of manufacturing steps, the liquid crystal display element is preferably manufactured by performing the first optical film bonding step and the second optical film bonding step in a continuous manufacturing line.

Figure 2:
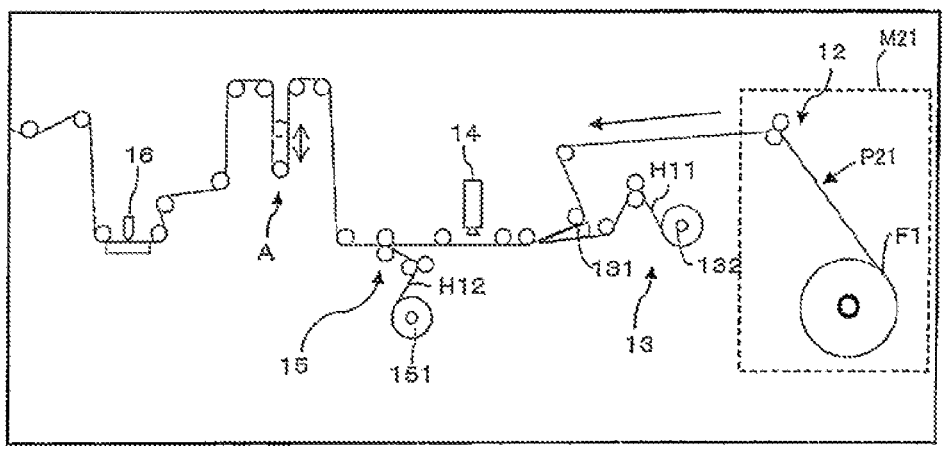
FIG. 2 is a schematic diagram showing an exemplary manufacturing system for use in the method of the invention for manufacturing a liquid crystal display element.
Figure 3:
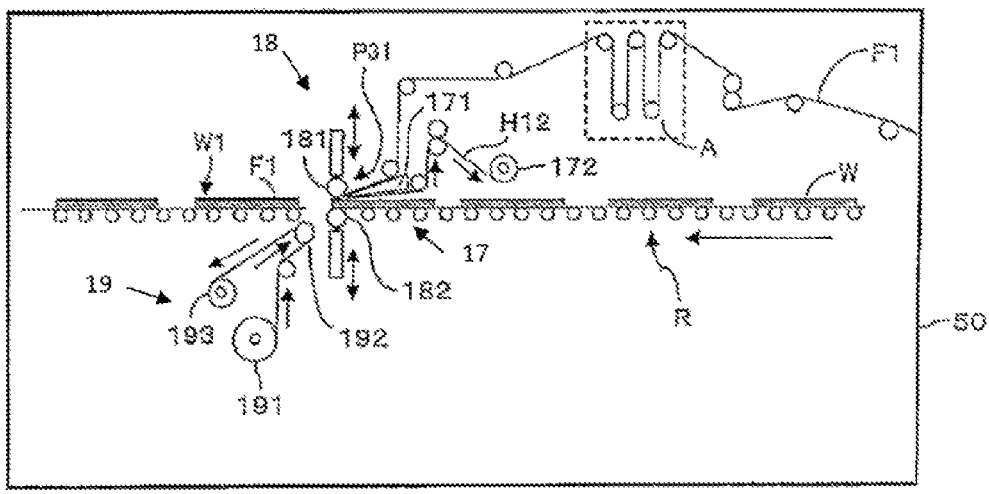
FIG. 3 is a schematic diagram showing an exemplary manufacturing system for use in the method of the invention for manufacturing a liquid crystal display element.

Next, a description is given of a manufacturing system for performing each step. As shown in FIGS. 2 and 3, an exemplary manufacturing system includes a first feeder 12, a first pre-inspection peeling apparatus 13, a first defect inspection apparatus 14, a first carrier film bonding apparatus 15, a first cutting apparatus 16, a first peeling apparatus 17, and a first bonding apparatus 18. In the invention, the first pre-inspection peeling apparatus 13, the first defect inspection apparatus 14, and the first carrier film bonding apparatus 15 are provided so that the first optical film inspection can be performed with high precision, while these apparatuses may be omitted.

The first roll of the first long sheet material F1 is mounted on a roll mount apparatus that is geared to a motor or the like to rotate freely or at a certain speed. A controller is provided to set the rotational speed and to control the drive.

The first feeder 12 is a feeding mechanism to feed the first sheet material F1 to the downstream side. The first feeder 12 includes a pair of nip rollers, a tension roller, a rotary drive, an accumulator A, a sensor, a controller, and so on, and it is controlled by the controller. The first feeder 12 feeds the uncut optical film or cut optical film pieces to the first bonding apparatus 18, while it applies a tensile force to the first carrier film. At the location of the first defect inspection apparatus 14, only the optical film without the first carrier film is fed to the downstream side.

The first pre-inspection peeling apparatus 13 is configured to peel off a carrier film H11 from the first sheet material F1 being fed and to wind it around a roll 132. The speed of winding it around the roll 132 is controlled by the controller. The peeling mechanism 131 has a sharp-ended knife edge and is configured so that the carrier film H11 can be peeled off by taking up the carrier film H11 with the knife edge and turning the direction of the feeding and that the first sheet material F1 peeled off from the carrier film H11 can be fed in the feeding direction.

The first defect inspection apparatus 14 inspects defects after the peeling of the carrier film H11. In the first defect inspection apparatus 14, image data taken by the CCD camera are analyzed so that defects can be detected and that their position coordinates can be calculated. The defect position coordinates are used in the skip cutting process with the first cutting apparatus 16 as described later.

The first carrier film bonding apparatus 15 bonds a carrier film H12 to the first optical film F11 with the first pressure-sensitive adhesive layer F14 interposed therebetween after the first defect inspection. As shown in FIG. 2, the carrier film H12 is unwound from a roll 151 of the carrier film H12, and the carrier film H12 and the first optical film F11 are inserted between one or more pairs of rollers 152 so that they are bonded to each other under a certain pressure from the pair of rollers 152. A rotating speed, a pressure and a feeding of the pair of rollers 152 are controlled by the controller.

After the carrier film H12 is bonded, the first cutting apparatus 16 cuts the first optical film F11 at predetermined intervals, while the continuity of the carrier film H12 is maintained. The invention is characterized in that in this process, the cutting is performed to such a depth as to substantially reach the carrier film H12 and that the carrier film H12 is cut to a depth less than half of the thickness of the carrier film H12 at least both end portions in the width direction of the carrier film H12. In the case of the first sheet material F1 shown in FIG. 4, the carrier film 1112 is not completely cut, while the first optical film F11, the surface protecting film F13, the first pressure-sensitive adhesive layer F14, and the pressure-sensitive adhesive layer F15 are each cut into a specific size.

Examples of the cutting means used in the first cutting apparatus 16 include a cutter having any of various blades, a laser, and any other known cutting means. In particular, a cutter having a knife-type blade, which will not be accompanied by grinding (in the case of saw type), is preferably used, because it is less likely to generate, dust such as sawdust. Examples of the cutter having a knife-type blade include a cutter in which cutting is performed with a blade being moved in the cutting direction, such as a cutter having a rotary circular blade, a stationary circular blade, a cutter knife, or the like; and a cutter in which cutting is performed with a blade not being moved in the cutting direction, such as a cutter having a shearing blade or a straight Thomson blade.

In the invention, the carrier film may be cut to a constant depth across the overall width of the carrier film, as long as the carrier film is eventually cut to a depth less than half of the thickness of the carrier film at least both end portions in the width direction of the carrier film, however, the cut depth is preferably smaller at both end portions in the width direction of the carrier film than at the other portions. Methods for the latter case include a method of controlling the vertical position of the mount surface, a method of controlling the vertical position of the blade, and a method of controlling both of them. In order to increase the accuracy, a method of controlling the vertical position of the mount surface is more preferred. When the blade is a sliding blade, the vertical position of the blade may be controlled by a method of controlling a rail on which the blade is moved. When a laser is used, the cut depth is preferably controlled by controlling the laser power.

Figure 5:
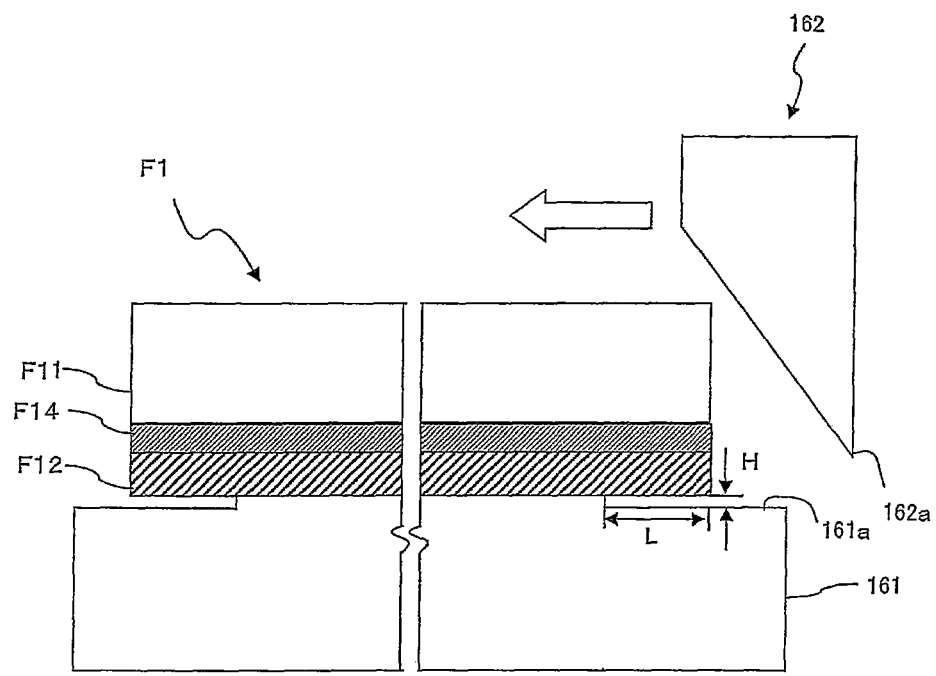
FIG. 5 is a schematic diagram showing an exemplary cutting apparatus for use in the method of the invention for manufacturing a liquid crystal display element.

In such a cutting apparatus as shown in FIG. 5, the carrier film F12 supported on a mount 161 is cut with a blade 162, while the vertical position of the surface of the mount 161 is lower at both end portions in the width direction of the carrier film F12 than at the other portions. In this example, the vertical position of a surface 161a of the mount 161 is lower by a height H in the regions each having a length L and extending from each end of the carrier film F12 than in the central region.

When such a mount 161 is used in the cutting process that includes allowing the edge 162a of the blade 162 to slide at the same level parallel to the surface of the mount 161, the distance between the surface of the mount 161 and the blade can be locally increased at both end portions in the width direction of the carrier film F12, so that the depth of the cut in the carrier film F12 can be smaller in the end portions than in the central portion.

While the blade 162 shown in FIG. 5 is a cutter knife blade, the blade 162 may be of a different type in producing the same effect. For example, not only a moving cutter with a rotary circular blade, a stationary circular blade or the like but also a cutter with a vertically-movable Thomson blade (shearing type) may be used.

When a laser is used as a cutting device, a holding table is placed to adsorb and hold the first sheet material F1 from the back side, and the laser is placed above the first sheet material F1. The laser is horizontally moved so that the first sheet material F1 can be scanned in the width direction with the laser, and the portion other than the carrier film H12 at the bottom is cut at predetermined pitches in the feeding direction. In a preferred mode, an air nozzle for blowing a warm wind to the portion being cut and a smoke collecting duct for collecting gas (smoke) generated from the portion being cut and carried by the warm wind are configured in combination and placed opposite to each other across the width of the first sheet material F1.

In the mount 161, the length L is preferably from 10 to 50 mm, more preferably from 15 to 40 mm. The height H at each end of the carrier film F12 is preferably from 3 μm to 30% of the thickness of the carrier film F12, more preferably from 2 μm to 25% of the thickness of the carrier film F12.

The example shown in FIG. 5 has a step portion so that the surface having a lower vertical position is formed to be parallel to the central portion of the mount 161. Alternatively, for example, the step portion may be formed by a curved surface, or the vertical position may be gradually changed (in a tapered manner).

In the cutting process, the cut depth preferably satisfies the relation $3\,\mu m < c < (d/2)\,\mu m$ over 60% or more, more preferably over 70% or more, even more preferably over 80% or more of the length of the cut, wherein c represents the depth of the cut in the carrier film, and d represents the thickness of the carrier film.

In view of these conditions, the thickness of the carrier film is preferably from 20 μm or more to less than 40 μm. Even in the same state of cut, the carrier film should be more reliably prevented from being broken in the continuous bonding process. From this point of view, the carrier film preferably has a breaking strength of 180 MPa or more, more preferably 200 MPa or more.

The cutting described above hardly produces a portion in which the pressure-sensitive adhesive layer is incompletely cut, is less likely to cause the laminated liquid crystal panel (liquid crystal display element) to have voids, which would otherwise be caused by the deformation of the pressure-sensitive adhesive layer, is less likely to cause peeling from the end portion, and is less likely to cause fatal defects such as light leakage, which would otherwise be caused by the above factors. Specifically, an incompletely cut portion of the pressure-sensitive adhesive layer is preferably 10% or less of the length of the cut, and an uncut portion of the pressure-sensitive adhesive layer preferably has a thickness of at most 3 μm.

Based on the defect position coordinates detected by the first defect inspection, the first cutting apparatus 16 cuts the material into a specific size in such a manner that defective portions can be separated. Therefore, cut pieces having any defective portion are rejected as defective by the first rejection apparatus 19 in a later step. Alternatively, the first cutting apparatus 16 may ignore defective portions and continuously cut the material into a specific size. In this case, the bonding process described later may be designed not to bond, but to remove the defective portions. In this case, the controller may also function to control the process.

If necessary, the first cutting apparatus 16 may have a holding table placed to adsorb and hold the first sheet material F1 from the back side. The accumulator A of the feeding mechanism is configured to move upward and downward in the vertical direction so that continuous feeding of the first sheet material F1 can be prevented from being stopped on the upstream and downstream sides when the holding table adsorbs the first sheet material F1. This operation is also controlled by the controller.

The first bonding apparatus 18 bonds each first sheet material F1 (each first optical film piece) to a liquid crystal panel W with the first pressure-sensitive adhesive layer F14 interposed therebetween, after the first sheet material F1 undergoes the cutting process and is peeled off from the carrier film H12 by the first peeling apparatus 17. The first sheet material F1 feeding route is placed above the liquid crystal panel W feeding route.

In the bonding process, as shown in FIG. 3, the first optical film F11 is bonded to the surface of the liquid crystal panel W, while it is pressed against the surface by a press roller 181 and a guide roller 182. The pressure from the press roller 181 and the guide roller 182 and the driving operation thereof are controlled by the controller.

The peeling mechanism 171 of the first peeling apparatus 17 has a sharp-ended edge member (knife) and is configured so that the carrier film H12 can be peeled off by taking up the carrier film H12 with the knife edge and turning the direction of the feeding and that the first sheet material F1 (the first optical film F11) peeled off from the carrier film H12 can be fed to the surface of the liquid crystal panel W. The peeled carrier film H12 is wound around a roll 172. Winding it around the roll 172 is controlled by the controller.

The tip of the edge member typically has a radius of curvature of 1 to 2 mm, preferably 1 to 1.5 mm, in order to smoothly peel off the carrier film H12 from the pressure-sensitive adhesive layer. In addition, the tensile force applied to the peeled carrier film H12 (the tensile force for peeling off) is typically from 0.1 to 0.2 N/mm, preferably from 0.15 to 0.2 N/mm, in view of stable feeding.

The bonding mechanism includes the press roller 181 and the guide roller 182 opposed thereto, which are placed in the bonding position P31. The guide roller 182 includes a rubber roller whose rotation is driven by a motor, and is provided movable upward and downward. The press roller 181 including a metallic roller whose rotation is driven by a motor is provided movable upward and downward immediately above the guide roller 182. When the liquid crystal panel W is fed to the bonding position, the press roller 181 is elevated to a position higher than the upper surface so that the space between the rollers is widened. Here, the guide roller 182 and the press roller 181 may each be a rubber roller or a metallic roller. As described above, the system is configured so that the liquid crystal panel W can be cleaned by any type of cleaning apparatus and fed by feeding mechanism R. The feeding mechanism R is also controlled by the controller.

A description is given of the first rejection apparatus 19 to reject the first sheet material F1 having a defect. When the first sheet material F1 having a defect is transported to the bonding position, the guide roller 182 moves vertically downward. Subsequently, a roller 192 over which a pressure-sensitive adhesive tape 191 is looped moves to the regular position of the guide roller 182. The press roller 181 is allowed to move vertically downward to press the first sheet material F1 having a defect against the pressure-sensitive adhesive tape 191. Therefore, the first sheet material F1 having a defect is bonded to the pressure-sensitive adhesive tape 191 and wound around a roller 193 together with the pressure-sensitive adhesive tape 191.

The liquid crystal panel W1 manufactured by the above process is transported to the downstream side, and the second optical film F21 (second sheet material F2) is bonded thereto. Since a series of the steps are the same as those for the first optical film F11 (first sheet material F1), a detailed description thereof will be omitted.

Liquid crystal display devices may be produced by conventional techniques using the liquid crystal display element according to the invention. Specifically, a liquid crystal display device may be typically formed by properly assembling a liquid crystal cell (liquid crystal panel) and optical films, and optional components such as a lighting system and incorporating a driving circuit. The liquid crystal cell to be used may be of any type such as TN type, STN type, n type, VA type, or IPS type.

Any appropriate liquid crystal display device may be formed, such as a liquid crystal display device including a liquid crystal cell and a pressure-sensitive adhesive optical film placed on one or both sides of the liquid crystal cell or a liquid crystal display device using a backlight or a reflector in the lighting system. In that case, the optical film according to the invention may be placed on one or both sides of the liquid crystal cell. The optical films placed on both sides may be the same or different.

In the process of forming the liquid crystal display device, one or more layers of an additional appropriate component or components such as a diffusion plate, an antiglare layer, an anti-reflection film, a protective plate, a prism array, a lens array sheet, a light diffusion plate, and a backlight may also be placed at an appropriate location or locations.

EXAMPLES

The invention is more specifically described in connection with the examples below, which are not intended to limit the scope of the invention. The evaluation items in the examples and so on were measured as described below.

(1) Average Cut Depth

After half cutting, the depth of the cut was measured at 40 points at intervals of 10 mm along the length (400 mm) of the half cut, and the average of the measurements was calculated. Based on the position of the interface between a separator and a pressure-sensitive adhesive layer, the mark "+" indicates a state where the cut is so deep that it reaches the separator, while the mark "−" indicates a state where the cut does not reach the separator.

(2) Degradation in the Appearance of Bonded Material

Cases where neither void nor peeling was generated at the end portions of the half cut during the bonding process were evaluated as "o." Cases where voids or peeling generated at the end portions of the half cut during the bonding process disappeared with time were evaluated as "Δ." Cases where the voids or peeling did not disappear were evaluated as "x."

(3) Percentage of Cut Portion

Based on the length of the cut, the percentage of the length of a portion of the cut where the depth (c) of the cut fell within the range satisfying the relation 3 μm<c<(d/2) μm, with respect to the thickness (d) of the carrier film, was calculated using the measurements at the 40 points, which were used in the calculation of the average cut depth.

(4) Percentage of Uncut Portion

Based on the length of the cut, the percentage of the length of a portion where a pressure-sensitive adhesive was left uncut was calculated using the measurements at the 40 points, which were used in the calculation of the average cut depth.

(5) Height of Uncut Portion

The height of the highest portion of the pressure-sensitive adhesive left uncut was determined using the measurements at the 40 points, which were used in the calculation of the average cut depth.

(6) Length of Completely Cut Portion at Both End Portions

The length of the portion where the film was completely cut was measured at both end portions of the carrier film (on both the left and right sides).

(7) Thickness of Both End Portions Left Uncut

The thickness of both end portions of the carrier film maintaining the continuity, namely, the thickness of both end portions left uncut was measured. The thickness of the cut may be calculated by subtracting the measured value from the thickness of the film.

(8) Evaluation of Breakage During Carrying

It was evaluated whether or not the carrier film was broken after the cutting of the optical film and before the peeling off of the carrier film.

(9) Evaluation of Breakage During Peeling-Off

It was evaluated whether or not the carrier film was broken in the process of peeling off the carrier film with a knife edge-shaped peeling bar.

Example 1

The sheet material used was a laminate of an optical film serving as a polarizing plate, a carrier film (PET, 38 μm in thickness, 202 MPa in breaking strength), and a surface protecting film (PET, 38 μm in thickness) with pressure-sensitive adhesive layers (acrylic pressure-sensitive adhesive, each 23 μm in thickness) interposed therebetween, respectively. The optical film was composed of a polarizer (an oriented iodine-containing PVA film, 28 μm in thickness) and polarizer-protecting films (triacetylcellulose films, each 80 μm in thickness) placed on both sides of the polarizer with an adhesive layer (PVA-based adhesive, 80 nm in thickness) interposed therebetween.

A long piece of the sheet material (400 mm in width) was cut at predetermined intervals to different average depths in the range from −15 μm to +35 μm using a cutter having a flat-surface mount and a cutting mechanism in which the edge of a cutter knife blade was allowed to slide (at a moving speed of 350 mm/second) at a constant level. In this process, the cut portion was evaluated as described above. The results of the evaluation are shown in Table 1.

TABLE 1

| Average cut depth | Degradation in the appearance of bonded material | Percentage of cut portion | Percentage of uncut portion | Height of uncut portion |
|---|---|---|---|---|
| +35 μm | broken | 0% | 0% | |
| +24 μm | broken | 45% | 0% | |
| +3 μm | ○ | 79% | 7% | 2 μm |
| +1 μm | Δ | 40% | 55% | 4 μm |
| −5 μm | Δ | 0% | 93% | 11 μm |
| −15 μm | X | 0% | 100% | 20 μm |

The results in Table 1 show that when the percentage of the cut portion was 60% or more, breaking was not observed. When the percentage of the uncut portion was 10% or less and when the height of the uncut portion was 3 μm or less, the appearance of the bonded material was evaluated as "o" with respect to degradation.

Example 2

Cutting and evaluation were performed under the same conditions as those in Example 1, except that the thickness of the carrier film was changed to 25 μm and that the average cut depth was changed in the range from −12 μm to +20 μm in response to the change in thickness. The results are shown in Table 2.

TABLE 2

| Average cut depth | Degradation in the appearance of bonded material | Percentage of cut portion | Percentage of uncut portion | Height of uncut portion |
|---|---|---|---|---|
| +20 μm | broken | 18% | 0% | |
| +15 μm | broken | 46% | 0% | |
| +4 μm | ○ | 84% | 2% | 1 μm |
| 0 μm | Δ | 41% | 13% | 4 μm |
| −4 μm | X | 10% | 78% | 9 μm |
| −12 μm | X | 0% | 100% | 18 μm |

The results in Table 2 show that when the percentage of the cut portion was 60% or more, breaking was not observed. When the percentage of the uncut portion was 10% or less and when the height of the uncut portion was 3 μm or less, the appearance of the bonded material was evaluated as "o" with respect to degradation.

Example 3

The optical film pieces resulting from the cutting in Examples 1 and 2 were used. A liquid crystal panel and each optical film piece were bonded together using the bonding apparatus shown in FIG. 3 (the radius of curvature of the edge of the peeling bar used to peel off the carrier film was 1.5 mm; the turning angle was 170° (the interior angle was 10°); the tensile force was 0.15 N/mm), which was provided continuously to the apparatus shown in FIG. 2. In this process, evaluation was performed as described above.

The results of the evaluation are shown in Table 3.

TABLE 3

| Film thickness | Length of completely cut portion at both end portions | Thickness of both end portions left uncut | Evaluation of breakage during carrying | Evaluation of breakage during peeling-off |
|---|---|---|---|---|
| 38 μm | right 0 mm, left 0 mm | right 22, left 21 | not broken | not broken |
| 38 μm | right 0 mm, left 0 mm | right 20, left 25 | not broken | not broken |
| 25 μm | right 0 mm, left 0 mm | right 13, left 12 | not broken | not broken |
| 38 μm | right 0 mm, left 0 mm | right 8, left 5 | not broken | broken |
| 38 μm | right 1 mm, left 2 mm | right 0, left 0 | broken | broken |
| 25 μm | right 3 mm, left 0 mm | right 0, left 7 | broken | broken |
| 25 μm | right 4 mm, left 1 mm | right 0, left 0 | broken | broken |

It has been found from the results in Table 3 that when the carrier film is fully cut at both end portions, the durability is significantly degraded. It has also been found that when the carrier film is cut to a depth equal to or greater than half of its thickness at both end portions, the carrier film is broken during the peeling off of it.

What is claimed is:

1. A method for manufacturing a liquid crystal display element, comprising:
   providing a long sheet material including a laminate of an optical film containing a polarizer, a pressure-sensitive adhesive layer, and a carrier film temporarily bonded to the pressure-sensitive adhesive layer;
   cutting the long sheet material at predetermined intervals, while maintaining the continuity of the carrier film;
   peeling off the carrier film by a tensile force; and
   continuously bonding the resulting optical film pieces to liquid crystal panels, respectively, through the pressure-sensitive adhesive layer exposed by the peeling off, while feeding the resulting optical film pieces, wherein the cutting is performed to such a depth as to substantially reach the carrier film, and
   the carrier film is cut to a depth less than half of the thickness of the carrier film at at least both end portions in the width direction of the carrier film, and the cut depth of the carrier film is smaller at both said end portions in the width direction of the carrier film than in a central portion.

2. The method according to claim 1, wherein the carrier film is peeled off from the pressure-sensitive adhesive layer by turning the direction of the feeding of the carrier film at an acute angle with an edge-shaped member.

3. The method according to claim 1, wherein in the cutting, the carrier film is supported on a mount and cut with a blade, and the vertical position of the surface of the mount is lower at both end portions in the width direction of the carrier film than at the other portions.

4. The method according to claim 1, wherein in the cutting, the relation: $3\ \mu m < c < (d/2)\ \mu m$, wherein c represents the depth of the cut in the carrier film, and d represents the thickness of the carrier film, is satisfied over 60% or more of the length of the cut.

5. The method according to claim 1, wherein the carrier film has a thickness of 20 μm or more to less than 40 μm.

6. The method according to claim 1, wherein the carrier film has a breaking strength of 180 MPa or more.

7. The method according to claim 1, wherein in the cutting, an incompletely cut portion of the pressure-sensitive adhesive layer is 10% or less of the length of the cut, and an uncut portion of the pressure-sensitive adhesive layer has a thickness of at most 3 μm.

8. The method according to claim 1, further including varying said cut depth of the carrier film such as to be smaller at both said end portions in the width direction of the carrier film than in said central portion by controlling a position of a mount surface and/or a position of a cutter.

* * * * *